(12) United States Patent
Ikeda et al.

(10) Patent No.: US 7,047,996 B2
(45) Date of Patent: May 23, 2006

(54) FLOW CONTROLLING APPARATUS

(75) Inventors: Tsuyoshi Ikeda, Chiryu (JP); Nobuyuki Kawabata, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 56 days.

(21) Appl. No.: 10/812,871

(22) Filed: Mar. 31, 2004

(65) Prior Publication Data

US 2004/0195038 A1    Oct. 7, 2004

(30) Foreign Application Priority Data

Apr. 4, 2003   (JP) ............................. 2003/101778

(51) Int. Cl.
 *G05D 11/00*   (2006.01)
 *B62D 5/06*   (2006.01)
(52) U.S. Cl. .................. 137/115.26; 180/422
(58) Field of Classification Search ........... 137/115.13, 137/115.15, 115.26, 601.14, 601.18; 180/422, 180/423
See application file for complete search history.

(56) References Cited

U.S. PATENT DOCUMENTS

| | | | |
|---|---|---|---|
| 4,267,897 A | 5/1981 | Takeshima | |
| 4,311,161 A | 1/1982 | Narumi et al. | |
| 4,605,085 A * | 8/1986 | Honaga et al. | ............. 180/423 |
| 5,111,660 A | 5/1992 | Gettel | |
| 5,519,614 A * | 5/1996 | Miichi et al. | ................. 701/44 |

FOREIGN PATENT DOCUMENTS

| | | |
|---|---|---|
| EP | 0 401 061 A1 | 12/1990 |
| JP | 2001-163233 | 6/2001 |

OTHER PUBLICATIONS

Patent Abstracts of Japan, JP 06-107213, Apr. 19, 1994.

\* cited by examiner

*Primary Examiner*—Edward K. Look
*Assistant Examiner*—John K. Fristoe, Jr.
(74) *Attorney, Agent, or Firm*—Oblon, Spivak, McClelland, Maier & Neustadt, P.C.

(57) ABSTRACT

A flow controlling apparatus to control flow rate of working fluid discharged from pump apparatus to a power steering apparatus including a electric variable throttle, a solenoid mechanism and a spool. The solenoid mechanism varies opening degree of the electric variable throttle based on a electric signal from electric controller. The spool slides in accordance with the differential pressure of the variable throttle due to increase of flow rate of working fluid discharged from pump apparatus so as to return excess working fluid to bypass passage connecting to a suction port of pump apparatus. The flow controlling apparatus further comprising means for increase flow rate of bypass flow to bypass passage when rotating speed of the pump apparatus exceed predetermined value.

7 Claims, 4 Drawing Sheets

FLOW CONTROLLING APPARATUS

CROSS-REFERENCE TO RELATED APPLICATION

This application based on and claims priority under 35 U.S.C §119 to Japanese Patent Application No. 2003-101778 filed on Apr. 4, 2003, the entire contents of which are incorporated herein by reference.

BACK GROUND OF THE INVENTION

1. Field of the Invention

The present invention relates to a flow controlling apparatus applied for a rotary pump apparatus applied for a power steering apparatus. Specifically, the present invention relates to the rotating speed responsive-type flow controlling apparatus capable of controlling flow rate of working fluid discharged to the power steering apparatus in accordance with rotating speed of the pump apparatus.

2. Description of the Related Art

It is disclosed a conventional flow controlling apparatus for an oil pump apparatus applied for a power steering apparatus of a vehicle in the Japanese Patent Laid-Open Publication 2001-163233. The flow controlling apparatus controls in such the way that flow rate of working fluid discharged to a power assist mechanism of the power steering apparatus is set to adequate amount in accordance with vehicle state such as vehicle velocity or steering angle. As the method for controlling flow rate of working fluid, a variable valve disposed on a discharge port of the conventional spool type flow controlling apparatus has been operated by a solenoid. Specifically, a electric signal corresponding to vehicle velocity or steering angle of the steering mechanism is input to the solenoid, the solenoid is operated in accordance with the electric signal, and a spool of the variable valve is slid in response to the operation of the solenoid. Consequently, it is adjusted flow rate of working fluid discharged to the power assist mechanism of the power steering apparatus.

The aforementioned flow controlling apparatus operates the solenoid in accordance with the electric signal, i.e. current value, corresponding to vehicle velocity or steering angle of a steering mechanism so that flow rate of working fluid discharged from the flow controlling apparatus to a hydraulic system serving as the power steering apparatus is adjusted to predetermined amount. Therefore, in the case when current value is maintained to be constant value, flow rate of working fluid discharged to the hydraulic system is set to be constant amount regardless rotating speed of engine, i.e. rotating speed of the pump apparatus.

However, in the actual operation of the flow controlling apparatus, flow rate of working fluid discharged from the flow controlling apparatus increases depending on increase of the rotating speed of the engine, i.e. rotating speed of the pump apparatus. Thus, flow velocity of a bypass flow enlarges at a bypass passage of the flow controlling apparatus, and a spool slides to close a bypass passage by fluid force caused by this enlarged flow velocity. Therefore, even when vehicle velocity or steering angle is maintained to be constant, flow rate of working fluid discharged to the hydraulic system increases depending on increase of rotating speed of the engine, and assisting force of the power steering apparatus may not be stabilized. This causes the problem that steering feeling is worsened.

SUMMARY OF THE INVENTION

The present invention has been devised consideration of the above problems. It is an object of the present invention to provide a flow controlling apparatus which reduce fluctuation of a steering feeling.

The present invention provides a flow controlling apparatus to control flow rate of working fluid discharged from a pump apparatus to a power steering apparatus including an electric variable throttle, a solenoid mechanism and a spool. The solenoid mechanism varies opening degree of the electric variable throttle based on the electric signal from an electric controller. The spool slides in accordance with the differential pressure of the variable throttle due to increase of flow rate of working fluid discharged from pump apparatus so as to return excess working fluid to a bypass passage connecting to a suction port of the pump apparatus. The flow controlling apparatus further comprising means for increasing flow rate of bypass flow to the bypass passage when rotating speed of the pump apparatus exceed predetermined value.

In addition, according to another aspect of the present invention, means for increasing flow rate of bypass flow to the bypass passage is in the form of an electric controller for controlling the solenoid mechanism to narrow down opening degree of the electric variable throttle in accordance with the increase of the rotating speed of the pump apparatus when rotating speed of the pump apparatus exceed predetermined value.

Further, according to other aspect of the present invention, means for increase flow rate of bypass flow to the bypass passage is in the form of a mechanical variable throttle disposed at upstream of the electric variable throttle so as to narrow down opening degree of the mechanical variable throttle in accordance with the increase of rotating speed of the pump apparatus.

DESCRIPTION OF THE PREFERRED EMBODIMENT

A flow controlling apparatus according to a first embodiment of the present invention will be described with reference to FIGS. 1,3 and 4.

Figure 1:
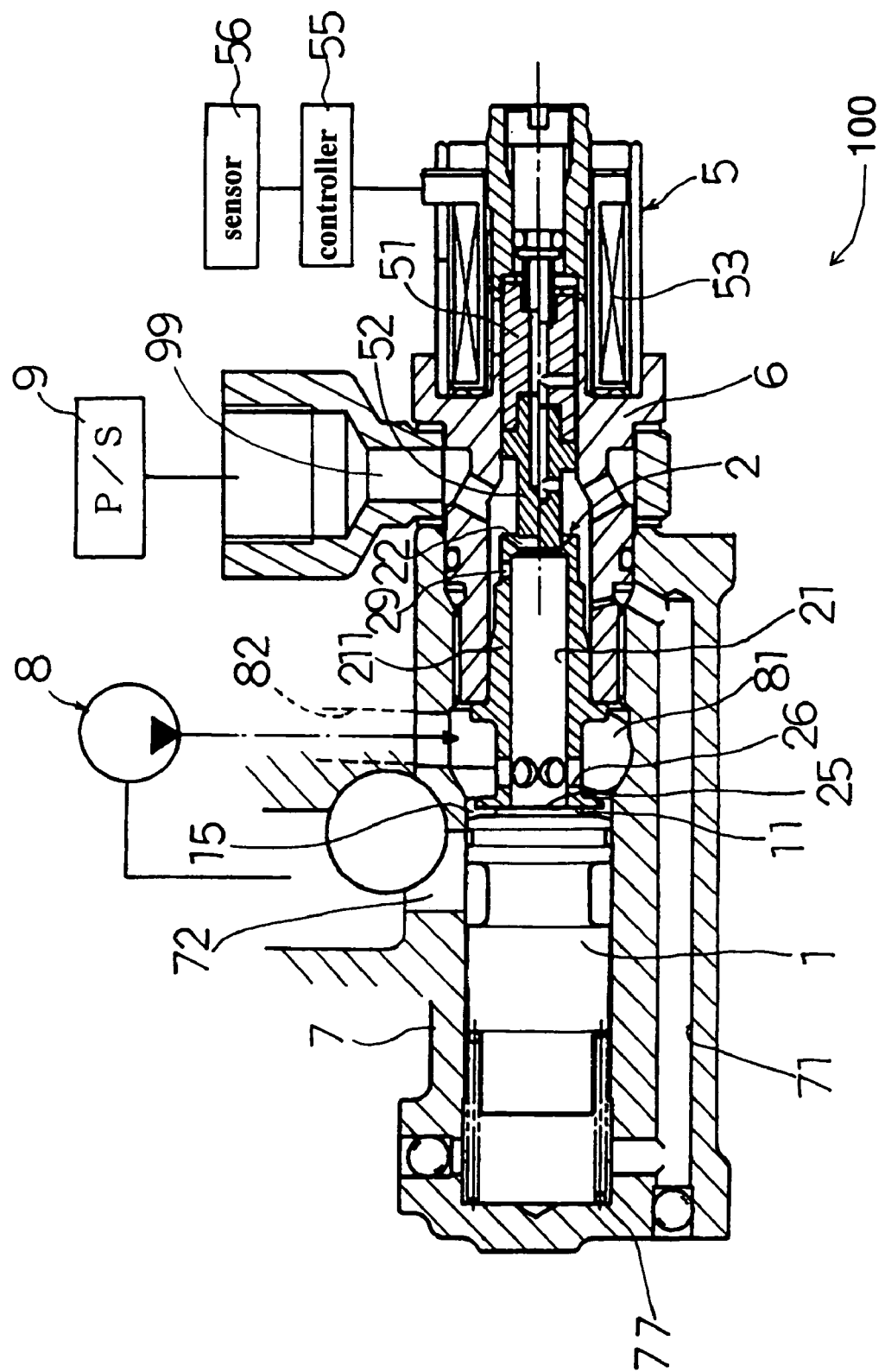
FIG. 1 is a longitudinal sectional view showing an overall structure of a flow controlling apparatus according to a first embodiment.

As shown in FIG. 1, The flow controlling apparatus includes a spool 1, a supplying passage 82 introducing working fluid from a pump apparatus 8, an oil introducing chamber 81 communicating with the supplying passage 82 and defined in vicinity of a spool head 11 of the spool 1, a housing 7 having a bypass passage 72 which returns excess fluid in the pump introducing chamber 81 to the pump apparatus 8, a union 6 disposed on one end of the housing 7, and variable throttle 2 accommodated in the union 6. The variable throttle 2 includes a valve body 52 operated by a solenoid mechanism 5. As shown in FIG. 3, components of the flow controlling apparatus are located integrally with respect to the pump apparatus 8.

As shown in FIG. 1, The spool 1 is slidably accommodated in the housing 7. A spring 77 is disposed in adjacent to one end of the spool 1 so as to urge the spool 1 toward a side of the spool head 11 side. Pressure of working fluid passed through a static throttle 29 and the variable throttle 2 is introduced to the chamber defined by the housing 7 and one end surface of the spool 1 via a pressure passage 71. Meanwhile, pressure of working fluid in a spool head chamber 15 communicating with the oil introducing chamber 81 acts on the other end of the spool 1, i.e. the spool head 11. Accordingly, the spool 1 slides in accordance with differential pressure caused by the static throttle 29 and the variable throttle 2. Specifically, opening degree of a path connecting the spool head chamber 15 with the bypass passage 72 is controlled in accordance with the differential pressure caused by static throttle 29 and the variable throttle 2. Consequently, excess working fluid in the oil introducing chamber 81 is returned to the bypass passage 72.

A cylindrical throttle configuring member 211 including a opening portion 25 facing with the spool head 11 and an oil inlet opening to the oil introducing chamber 81 is disposed in the housing 7 with one end thereof facing to the spool head 11. A throttle hole 22 and the static throttle 29 are formed in the vicinity of the other end of the throttle configuring member 211. A rod-like valve body 52 which varies the opening degree of the throttle hole 22 is accommodated in the union 6 with facing the throttle hole 22. The valve body 52 is connected to a movable core 51 configuring a solenoid mechanism 5 so as to slide along with the central axis of the throttle hole 22 in conjunction with the movement of the movable core 51. A clearance between the valve body 52 and the throttle hole 22 varies depending on the sliding movement of the valve body 52 along with the central axis of the throttle hole. The throttle hole 22 and the valve body 52 configures the variable throttle 2. By varying the clearance of the variable throttle 2, spool 1 slides against urging force of the spring 77. Thus, excess working fluid introduced in the oil introducing chamber 81 is returned to the bypass passage 72 through the spool head chamber 15.

In the aforementioned construction, the solenoid mechanism 5 which actuates the valve body 52 includes the movable core 51 connected to the valve body 52 and a coil 53 which is surrounding the movable core 51 and actuates the movable core 51 in the axial direction thereof. The solenoid mechanism 5 is connected to a control device 55 (i.e. electric controller) controlling the solenoid 5. Further, a rotating speed sensor 56 detecting the rotating speed of the pump apparatus 8 is connected to the control device 55. Still further, various types of sensors 56' detecting vehicle state may be connected to the control device 55 to control the solenoid mechanism 5.

The operation of the flow controlling apparatus according to the first embodiment will be described below.

When the pump apparatus 8 starts to rotate, working fluid discharged from the pump apparatus 8 is introduced to the oil introducing chamber 81 through the supplying passage 82. Working fluid introduced in the oil introducing chamber 81 is transmitted to a hydraulic mechanism 9 serving as a power steering apparatus through an oil inlet 26, a passage 21, the static throttle 29 or the variable throttle 2, and a discharging port 99 formed on the union 6. In this configuration, when rotating speed of the pump apparatus 8 increases and flow rate of working fluid discharged from the pump apparatus 8 exceeds predetermined value, the spool 1 slides against urging force of the spring 77 in accordance with the differential pressure caused by the static throttle 29. Thus, the spool head chamber 15 communicates with the bypass passage 72 and excess working fluid is returned to the bypass passage 72. Therefore, flow rate of working fluid discharged from the discharging port 99 is maintained as constant value. In other word, a constant flow rate control state is established.

In this state, when rotating speed of the pump apparatus 8 further increases, flow rate of working fluid introduced in the oil introducing chamber 81 increases depending on increase of flow rate of working fluid discharged from the pump apparatus 8. Thus, flow rate of working fluid returned from the spool head chamber 15 to the bypass passage 72 increases and flow velocity of working fluid returned to the bypass passage 72 also increases, that is, flow velocity of bypass flow increases. Accordingly, the spool 1 slides to move toward the opening portion 25 of the throttle configuring member 211 by flow force caused and to close the bypass passage 72 by bypass flow. Consequently, excess working fluid is transmitted to the hydraulic mechanism 9 serving as the power steering apparatus due to the increase of rotating speed of the pump apparatus 8 as broken lines shown in FIG. 4. This would tend to cause generation of excessive assist force in the power steering apparatus to worsen steering feeling. Further, excess working fluid would tend to be transmitted to the hydraulic mechanism 9 even when much power assist is not needed, for example when the vehicle is traveling at high speed, so that the effect of energy saving is reduced.

Figure 3:
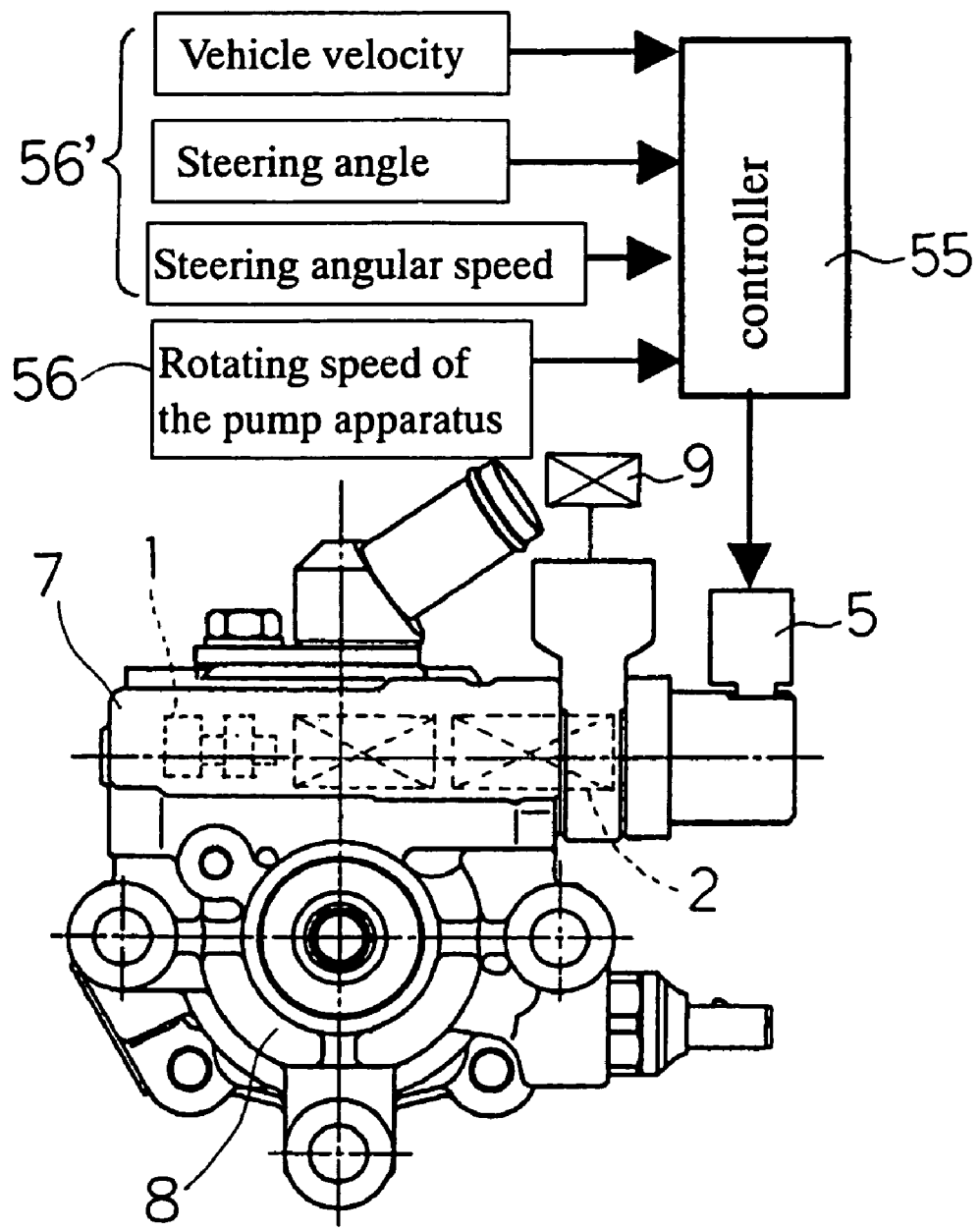
FIG. 3 is a plane view showing an overall structure of the flow controlling apparatus according to first and second embodiments.
Figure 4:
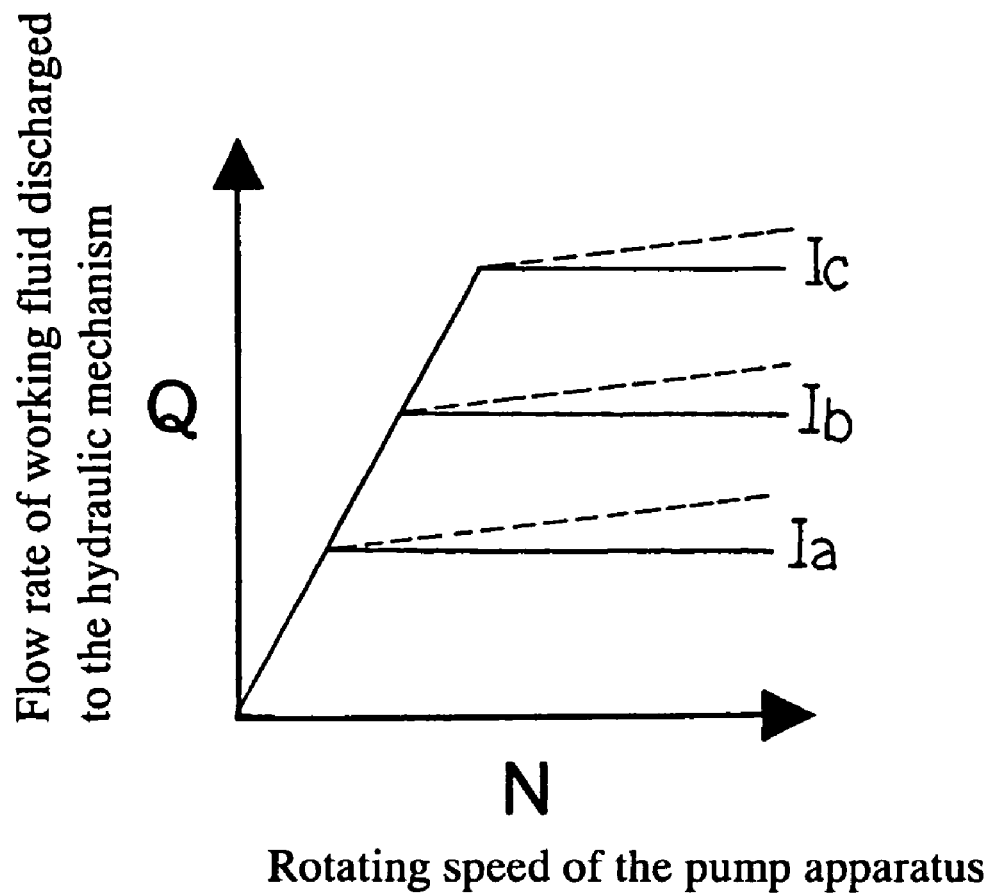
FIG. 4 is a graph showing the relationship between rotating speed of a pump apparatus and flow rate of working fluid discharged from flow controlling apparatus.

To solve these possible problems, the pump rotating speed sensor 56 is connected to the control device 55 in the present embodiment as shown in FIG. 3. The control device 55 receives the signal corresponding to the rotating speed of the pump apparatus 8 from the pump rotating speed sensor 56 and controls the solenoid mechanism 5. Specifically, the solenoid mechanism 5 is controlled to decrease the clearance between the valve body 52 and the throttle hole 22 by sliding the valve body 52. Thus, differential pressure caused by the variable throttle 2 increases and the spool 1 slides against urging force of the spring 77. Accordingly, sufficient opening portion is formed between the spool head chamber 15 and the bypass passage 72 so that excess working fluid discharged from the pump apparatus 8 is adequately returned to the bypass passage 72. Consequently, increase of flow rate of working fluid transmitted from discharging port 99 to the hydraulic mechanism 9 serving as the power steering mechanism is suppressed as continuous lines shown in FIG. 4. In other words, the variable throttle 2 with the solenoid mechanism 5 configures an electric variable throttle. Therefore, fluctuation of steering feeling is restricted when the vehicle is traveling at constant velocity at high speed. Still further, effect of energy saving is obtained when vehicle is traveling at high speed or steering wheel is not steered.

A flow controlling apparatus 200 according to a second embodiment of the present invention will be described with reference to FIGS. 2, 3 and 4 by focusing on difference with the first embodiment.

In the flow controlling apparatus 200 according to the second embodiment, the electric variable throttle 2 is disposed in vicinity to the discharging port 99 of the throttle configuration body 211 as well as the flow controlling apparatus 100 according to the first embodiment. The rotating speed signal and various type of signals representing vehicle state are input to the solenoid mechanism 5 via the control device 55 so that the control device 55 control the solenoid mechanism 5 to operate the electric variable throttle mechanism 2. Specifically, the sensors 56' which consists of a vehicle velocity sensor and steering angle sensor sends various signals representing vehicle state to the control device 55. Then, the control device 55 receives the signals and controls discharge amount of working fluid discharged to the hydraulic mechanism 9 in accordance with vehicle velocity, steering angle and the like.

Figure 2:
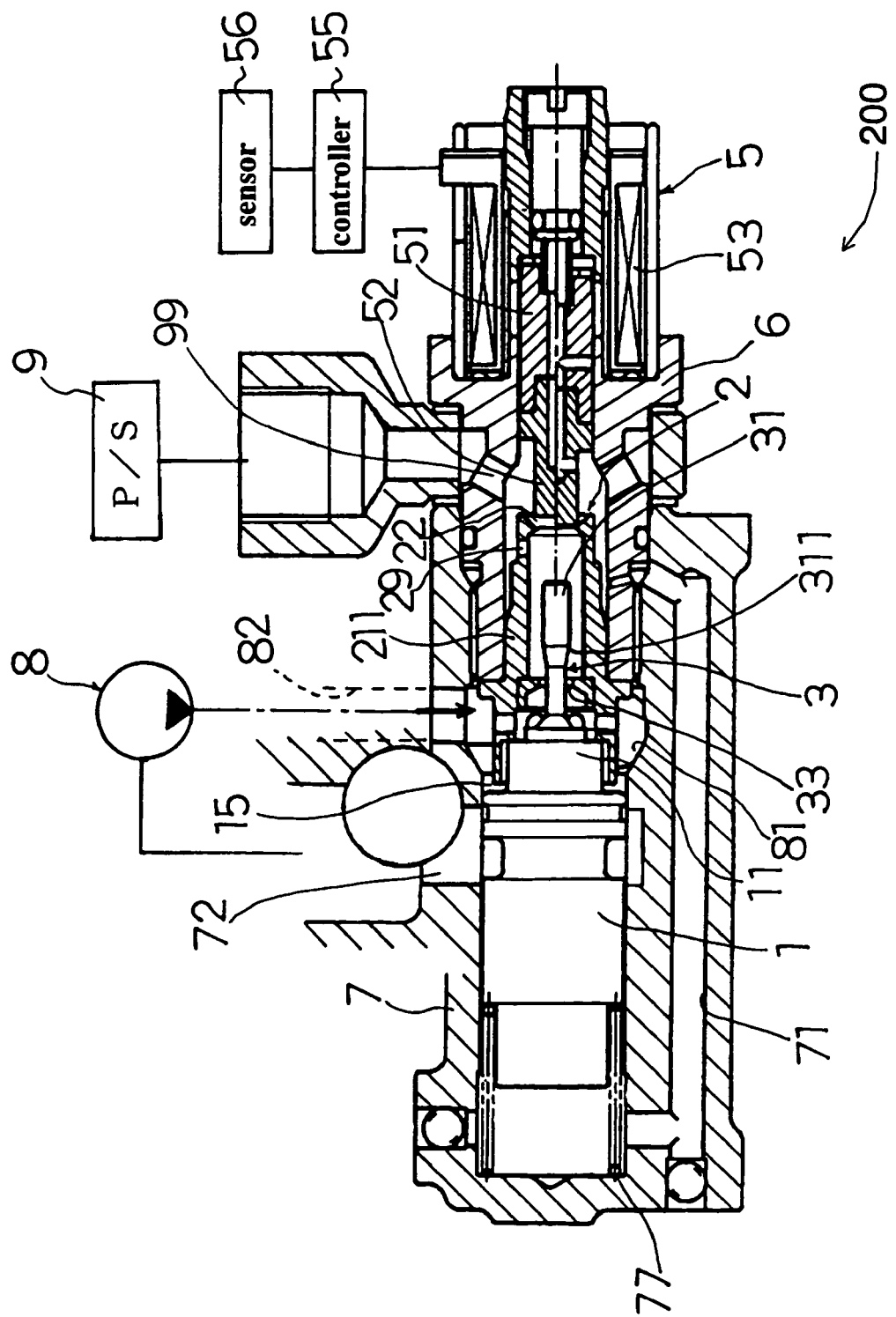
FIG. 2 is a longitudinal sectional view showing an overall structure of a flow controlling apparatus according to a second embodiment.

The flow controlling apparatus 200 includes a mechanical variable throttle 3 being alternative to the oil inlet 26 as shown in FIG. 2. The mechanical variable throttle 3 is a mechanical-type throttle which is essentially configured by a throttle hole 33 and a movable rod 31 with the rod-shape. The throttle hole 33 is disposed at a opening portion of the valve configuration member 211 at a side of the spool 1 and have predetermined inner diameter. The movable rod 31 is movable relative to the throttle hole 33 in the axial direction of the throttle hole 33 and integrally disposed on the spool head 11 of the spool 1. With this configuration, the throttle valve 3 inhibit decreasing of the flow rate of working fluid discharged to the hydraulic mechanism 9 due to increasing of rotating speed of the pump apparatus 8.

More specifically, the movable rod 31 is secured to the spool head 11 at one end thereof and movable along with the throttle hole 33 being synchronized with the movement of the spool 1. Further, a tapered potion 311 is formed on the movable rod 31 to move relative to the throttle hole 33 so that the diameter of the tapered portion 311 become smaller as approaches to the spool head 11 of the spool 1. That is, the tapered portion 311 is formed such a manner that the clearance between the tapered portion 311 of the movable rod 31 and the throttle hole 33 become smaller as spool 1 slides toward the spring 77. Meanwhile, the clearance between the tapered portion 311 of the movable rod 31 and the throttle hole 33 is become lager as the spool 1 slides to reduce the opening degree of the opening portion between the spool head chamber 15 and the bypass passage 72.

With such a configuration, when the spool 11 slides toward the spring 77 due to the increase of the rotating speed of the pump apparatus 8, the opening degree of the throttle hole 33 is reduced by the movable rod 31 to increase the differential pressure applied to the spool 11 so that the spool 11 further slides toward the spring 77. Thus, the increased amount of discharged flow rate due to the fluid force of bypass flow which attracts the spool 11 and the decreased amount of the discharged flow rate due to the operation of the mechanical variable throttle 3 are canceled each other. Accordingly, flow rate discharged to the hydraulic mechanism 9 is maintained at constant value as continuous line shown in FIG. 4. That is, since working fluid discharged from the discharging port 99 to the hydraulic mechanism 9 is not increased. Consequently, energy-saving hydraulic system is achieved.

In the meanwhile, according to the second embodiment, changes to the technical specification of the flow controlling apparatus is possible by modifying not the solenoid mechanism but other mechanism in mechanical manner. As a result, cost for changing the technical specification of the flow controlling apparatus can be reduced.

In the second embodiment, the mechanical variable throttle 3 consist of the throttle hole 33 and the movable rod 31 formed integrally with the spool 1. However, the mechanical variable throttle is not restricted that, for example, the mechanical variable throttle can be modified such that a sub-spool is disposed at upstream of the electric variable throttle 1.

According to the embodiments of the present invention with the aforementioned configurations, when the rotating speed of the engine increases, i.e. when the rotating speed of the pump apparatus increases, the opening degree of the variable throttle is narrow downed. Therefore, it is restricted that the discharge amount of flow rate to the hydraulic apparatus increases due to the decrease of flow rate of bypass flow to the bypass passage resulting from the hydraulic force caused by the high flow velocity of bypass flow to the bypass passage. That is, in the present embodiments, the electric signal corresponding to the rotating speed of the engine or the pump apparatus is input to the solenoid mechanism via the control device, and the control device control the solenoid mechanism to narrow down the opening degree of the variable throttle in accordance with the electric signal. Accordingly, the spool is slid toward the spring 77 due to the increase of the differential pressure so that flow rate of the bypass flow to the bypass passage increases. As a result, since flow rate of working fluid discharged to the hydraulic mechanism is controlled to constant value, stable steering feeling is obtained at the state that vehicle velocity is maintained to constant. Further, excessive flow rate of working fluid is prevented from discharged to the hydraulic mechanism configuring the power steering apparatus when the steering wheel is not steered. Thus, energy saving is achieved.

According to the present embodiments, especially, second embodiment, flat steering feeling is obtained at the state that vehicle velocity is maintained to constant and energy saving is achieved when the steering wheel is not steered. Further, the change of the mechanical specification of the flow controlling apparatus is achieved by only modifying the mechanical structure of the flow controlling apparatus without modifying the hardware or the software in the control system. Therefore, costs resulting from the change of the mechanical specification is reduced. Still further, according to the second embodiment, the change of the mechanical specification has become easier by using the movable rod in the mechanical variable throttle. Therefore, costs resulting from the change of the mechanical specification is further reduced.

The embodiment of the present invention have been described in the foregoing specification and drawings. However, the invention which is intended to be protected is not to be construed as limited to the particular embodiment disclosed. Further, the embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from spirit of the present invention. Accordingly, it is expressly intended that all variations, changes and equivalents which fall within the spirit and scope of the present invention as defined in the claims, be embraced thereby.

We claim:

1. A flow controlling apparatus to control a flow rate of a working fluid discharged from a pump apparatus to a power steering apparatus, comprising:
   an electric variable throttle;
   a solenoid mechanism for varying an opening degree of the electric variable throttle based on an electric signal from an electric controller;
   a spool which slides in accordance with the differential pressure of the variable throttle due to an increase of the flow rate of the working fluid discharged from the pump apparatus so as to return an excess working fluid to a bypass passage connecting to a suction port of the pump apparatus; and an electric controller for controlling the solenoid mechanism to narrow down the opening degree of the electric variable throttle in accordance with the increase of the rotating speed of the pump apparatus when the rotating speed of the pump apparatus exceeds the predetermined value.

2. The flow controlling apparatus according to claim 1, wherein the electric controller controls the solenoid mechanism based on a vehicle state.

3. A flow controlling apparatus to control a flow rate of a working fluid discharged from a pump apparatus to a power steering apparatus, comprising:

an electric variable throttle;

a solenoid mechanism for varying an opening degree of the electric variable throttle based on an electric signal from an electric controller;

a spool which slides in accordance with the differential pressure of the variable throttle due to an increase of the flow rate of the working fluid discharged from the pump apparatus so as to return an excess working fluid to a bypass passage connecting to a suction port of the pump apparatus; and means for increasing the flow rate of the bypass flow to the bypass passage when the rotating speed of the pump apparatus exceeds a predetermined value, wherein the means for increasing the flow rate of the bypass flow to the bypass passage comprises a mechanical variable throttle disposed upstream of the electric variable throttle so as to narrow down the opening degree of the mechanical variable throttle in accordance with the increase of the rotating speed of the pump apparatus.

4. The flow controlling apparatus according to claim 3, wherein the electric controller controls the solenoid mechanism based on the vehicle state.

5. The flow controlling apparatus according to claim 3, wherein the mechanical variable throttle comprises:

a movable rod disposed on the spool head of the spool, formed in a rod-shape and integrally movable with the spool; wherein the opening degree of the mechanical variable throttle is controlled by the operation of the movable rod.

6. A flow controlling apparatus to control flow rate of working fluid discharged from pump apparatus to a power steering apparatus comprising:

at least one sensor for detecting a vehicle state;

an electric controller for generating an electric signal based on the vehicle state detected by said at least one sensor;

an electric variable throttle;

a solenoid mechanism for varying the opening degree of the electric variable throttle based on the electric signal from the electric controller;

a spool which slides in accordance with the differential pressure of the variable throttle due to an increase of the flow rate of the working fluid discharged from the pump apparatus so as to return an excess working fluid to a bypass passage connecting to a suction port of the pump apparatus; wherein electric controller controls the solenoid mechanism in accordance with the vehicle state; and a sensor for detecting the rotating speed of the pump apparatus, wherein the electric controller controls the solenoid mechanism so as to narrow down the opening degree of the electric variable throttle in accordance with the increase of the rotating speed of the pump apparatus when the rotating speed of the pump apparatus exceeds a predetermined value.

7. A flow controlling apparatus to control a flow rate of a working fluid discharged from a pump apparatus to a power steering apparatus, comprising:

at least one sensor for detecting a vehicle state;

an electric controller for generating an electric signal based on the vehicle state detected by said at least one sensor;

an electric variable throttle;

a solenoid mechanism for varying the opening degree of the electric variable throttle based on the electric signal from the electric controller;

a spool which slides in accordance with the differential pressure of the variable throttle due to an increase of the flow rate of the working fluid discharged from the pump apparatus so as to return an excess working fluid to a bypass passage connecting to a suction port of the pump apparatus; wherein electric controller controls the solenoid mechanism in accordance with the vehicle state; and a mechanical variable throttle disposed up stream of the electric variable throttle so as to narrow down the opening degree of the mechanical variable throttle in accordance with the increase of the rotating speed of the pump apparatus.

* * * * *